United States Patent [19]

Davidson

[11] 4,282,059

[45] Aug. 4, 1981

[54] PAPER FILLERS

[75] Inventor: Richard R. Davidson, Barton, England

[73] Assignee: Associated Portland Cement Manufacturers Limited, London, England

[21] Appl. No.: 100,117

[22] Filed: Dec. 4, 1979

Related U.S. Application Data

[63] Continuation of Ser. No. 852,705, Nov. 18, 1977, abandoned, which is a continuation of Ser. No. 636,566, Dec. 1, 1975, abandoned.

[30] Foreign Application Priority Data

Dec. 10, 1974 [GB] United Kingdom ............... 53309/74

[51] Int. Cl.$^3$ .............................................. D21D 3/00
[52] U.S. Cl. ................... 162/158; 162/168 R; 162/168 NA; 162/174; 162/181 R; 162/181 A; 162/181 B; 162/181 D; 162/183

[58] Field of Search ....... 162/168 R, 168 NA, 181 R, 162/181 A, 181 B, 175, 183, 158, 174; 106/308 M, 308 N; 210/54 R, 54 A; 264/13, 14

[56] References Cited

U.S. PATENT DOCUMENTS

| 3,082,173 | 3/1963 | Horvitz | 210/54 R |
| 3,492,225 | 1/1970 | Ryznar | 210/54 R |
| 4,115,187 | 9/1978 | Davidson | 162/175 |

FOREIGN PATENT DOCUMENTS 1353015  5/1974  United Kingdom .

Primary Examiner—Peter Chin
Attorney, Agent, or Firm—Diller, Ramik & Wight

[57] ABSTRACT

An aqueous suspension of particles is treated by introducing into the system an anionic polymeric flocculant and at least one counteracting anionic deflocculant, the activity of the anionic deflocculant being reduced or eliminated by bringing into contact therewith in the system an aqueous solution containing cations having a valency greater than one, a material which generates such cations, or a polycationic organic compound.

5 Claims, No Drawings

PAPER FILLERS

This is a continuation of application Ser. No. 852,705 of Nov. 18, 1977, abandoned which is rule 60 continuation 636,566 of Dec. 1, 1975 now abandoned.

The present invention relates to the treatment of an aqueous particulate system with a flocculant, and more particularly to the formation of agglomerates in such aqueous system and to compositions and methods for achieving such formation. The invention is especially applicable to the preparation of filler materials suitable for use in paper making, which we refer to simply as fillers, and will for convenience be described with reference to such fillers.

It is customary in a furnish for papers manufactured for printing or writing purposes to include mineral fillers. As the proportion of filler to cellulose pulp increases, the opacity of the paper increases but the strength properties decrease. When mineral fillers are employed in paper-making these tend to be lost into the water which is drained from the wet web as the latter is formed on the paper machine wire. It is therefore customary to add retention aids for the filler and fibre fines. These are normally organic polymers of high molecular weight which tend to co-flocculate the filler particles and cellulose fibres. The fillers are thus held into the forming web and are not lost in the water which is drained from it.

It is known in the paper-making industry that filler particles of large particle size tend at a given weight proportion to be better retained in the paper web and to interfere less with fibre bonding, than do filler particles of small particle size. It is believed that the fine particles more completely coat the cellulose fibres under the influence of the retention aid, and therefore interfere more with the hydrogen bonding between the fibres which gives the paper its strength. It is also known that fine mineral filler particles agglomerated together independently of the cellulose fibres act like large single filler particles and interfere less with bonding than if they were not so agglomerated. Agglomerates of small particles have advantages over large and single particles in being less abrasive and in being deformable in the paper forming process. They thus tend to flatten parallel to the paper surface, which helps in giving good opacity and smoothness.

It is already known to prepare filler agglomerates by forming suspensions of filler particles in water containing a precipitatable organic polymer in colloidal solution.

It is an object of the present invention to provide an advantageous method of treating an aqueous particulate filler system with an anionic polymeric flocculant. It is also an object of the invention to provide an advantageous method of agglomerating particles of filler to be used in paper-making. It is a particular object of the invention to provide agglomerates from calcium carbonate particles useful in paper-making.

It is another object of the invention to provide a filler composition or an aqueous particulate filler system suitable for the preparation of agglomerates.

According to the present invention a method of treating an aqueous particulate system with an anionic polymeric flocculant, is characterised by introducing into the particulate system both the anionic polymeric flocculant and at least one counteracting anionic deflocculant, the activity of the anionic deflocculant being reduced by bringing into contact therewith in said system an aqueous solution containing cations selected from the group comprising cations having a valency greater than one, materials which generate such cations, and polycationic organic compounds. In this manner agglomerates with highly useful properties are produced from suspended particles.

The said reduction of the activity of the anionic deflocculant may be sufficient to eliminate such activity and may take place simultaneously with or subsequently to the introduction of said flocculant and deflocculant to the system. The aqueous particulate system containing the particles to be agglomerated, the flocculant and the deflocculant, may be prepared by bringing together these three components in water in any order, although in individual cases one sequence may be found more advantageous than another. Generally when the flocculant is added first to the aqueous suspension of, say, chalk whiting, before the deflocculant is added, the mix first thickens considerably as the flocculant goes in; after the deflocculant is stirred in, thinning occurs with time to yield a suspension which forms agglomerates according to the invention on being brought together with the solution containing cations. The aqueous particulate system and the aqueous solution containing cations may be brought into contact by adding the one to the other in either order, with a batchwise, continuous in-line, or special mixing operation.

The particulate system is generally a suspension of mineral particles in water. This water may be hard water or water effectively free from, or chemically freed from, dissolved ions of alkaline earth metals or metals of equal or higher valency. The invention is especially applicable to particulate systems in which the particles in question are particles of a filler suitable, e.g., for paper making, and the invention will be described with particular reference to paper fillers for convenience and simplicity but it is also applicable more generally, for instance to particulate wastes from many industries, e.g., for stabilising lagoons of water-softening waste, or where sufficiently strong flocs are needed for press filtering, as in sewage treatment.

We refer to the said aqueous solution containing cations for convenience as hard water or hardened water, because it is commonly exemplified either by hard water (e.g., having a hardness corresponding to at least 100 ppm calcium carbonate) or by soft water or paper machine backwater, which may be wholly or partially clarified, containing or having added thereto dissolved papermakers' alum, calcium salts, magnesium salts or other salts providing the cations. It may be hard tap-water.

The anionic polymeric flocculant should be one which is not of itself precipitated from an aqueous dispersion thereof by the addition of the hard or hardened water.

Preferably a suspension constituting the aqueous particulate system is prepared with de-ionised water and has an addition of a substance causing the concentration of cations such as calcium ions to fall by precipitation e.g., as calcium carbonate. For this purpose ammonia with ammonium carbonate is preferred but the use of sodium hydroxide and sodium carbonate and/or a sequestering agent enables hard water to be employed. A suitable pH value for minimum dissolved calcium is 9.5.

It is found, surprisingly, that whereas the flocculant is not insolubilised or precipitated by the hard or hardened water if present alone, solid particles, e.g., of filler such as calcium carbonate, in the presence of the deflocculant and the flocculant, in the hard or hardened water form agglomerates of controllable properties. The particle size, shape and strength of the agglomerates and the desired clarity of the supernatant liquid is controlled by the choice and proportions of the deflocculating agent and of the flocculating agent, by the intensity of mixing of the particle suspension into the hard or hardened water and by the hardness of the water.

It is an advantage if the solids content of the aqueous particle suspension containing flocculant, deflocculant and solid particles to be agglomerated, is high, especially if the economic formation of filiform agglomerates is desired. Filiform agglomerates of mineral filler particles of dimensions comparable to those fibres used in papermaking are of particular interest in relation to paper fillers. Certain suspensions of chalk whiting have been found, however, to give agglomerates even if diluted down to solids contents below 20 percent by weight, when added to hard water.

The flocculant and deflocculant used in the present invention, and the limits of proportions of these materials used, should satisfy the following conditions:
1. The deflocculant will deflocculate a suspension in water of the particles to be agglomerated;
2. The flocculant will thicken a suspension in water of the particles to be agglomerated;
3. The deflocculated suspension produced in (1) will not, however, be thickened by adding the flocculant;
4. The deflocculated suspension produced in (3) and containing the flocculant, will be thickened by adding the hard or hardened water, e.g., a solution of a calcium salt.

Suitable anionic polymeric flocculants, of which more than one may be used at once, include substances used in papermaking as retention aids for paper fillers, such as those of the polyacrylamide type. In practice, an amount by weight on a solids basis, calculated on the substance to be agglomerated, of flocculant such as a polyacrylamide, of at least $4 \times 10^{-5}$ percent, below which dispersion occurs and agglomerates are not formed, is found useful. The upper limit to the amount of flocculant is determined to a large extent by cost; up to 0.1 percent may be found satisfactory.

A preferred range is from 0.01 to 0.03 percent.

Various types of anionic deflocculant may be employed. For instance, polyacrylates such as Dispex N40 may be used, whose activity is not greatly decreased by calcium ions; foreign ions decrease the activity of all anionic deflocculants to some extent. Materials such as polyphosphates like Calgon may be used where calcium can chelate with more than one phosphate group and so reduce its activity. Carboxylated polyphosphates like Nopcosant K are useful as particularly indicated in the Examples below; they show some evidence of precipitation in hard water by the formation of a cloud. Other materials which can be used are silicates like Pyramid 8 which form a definite precipitate with hard water, although sometimes only slowly. Other polymeric anionic materials may be used, for instance, alkali solubilised lactic casein, which is an admirable deflocculant for whiting, is clearly precipitated by hard water, calcium caseinate being insoluble.

In practice, there is used an amount of deflocculant such as those just mentioned, at least as much as that below which a strong permanent thickening action occurs on adding the flocculant as in (3). The upper limit is indicated by the appearance of cloudiness and failure, due to dispersion of agglomerates, to satisfy (4); the proportion should be such as to incur minimum cost. Within these bounds, a preferred range, by weight on a solids basis calculated on the substance to be agglomerated, of from 0.01 to 0.5 percent.

The invention is especially advantageous as applied to calcium carbonate, particularly chalk whiting as the substance to be agglomerated, for use as a filler in papermaking. The invention may also be applied, for instance, to suspensions containing, in addition to or alternatively to chalk whiting, an amount of titanium dioxide, or of clay, which latter may be present for example from the use of paper machine backwater as the hard or hardened water.

The agglomerates produced by the method of the invention may, if desired, be further treated for specific purposes. It is not normally necessary to treat them to confer acid resistance upon them for use as filler material in paper making using alum/rosin sizing, since they already possess sufficient such resistance by virtue of the treatment according to the invention. They are of use also in neutral or alkaline sizing systems. Further materials may be included in the suspension of e.g., filler, deflocculant and flocculant, such as starch or other polymeric substances, for instance, in solution, emulsion or latex form, or inorganic gel-forming materials such as Laponite RD (Laporte Industries), a synthetic montmorillonite. Such additions can have a beneficial effect on the strength of the agglomerates produced, by virtue of entrapment within the agglomerate.

It is further advantageous to add a retention aid continuously to the pulp/filler agglomerate papermaking thin stock. This retention aid may surprisingly be a cationic material, such as a cationic polyacrylamide, or an anionic polyacrylamide with alum addition, or a cationic starch. These are used to give fibre retention on the paper machine. Cationic starch is especially useful because it has a bonding action on the fibres independently of the filler.

Although the scope and performance of the present invention do not depend on adherence to any particular theory, the following theoretical considerations may assist towards a full understanding of the invention by way of background.

The theory of the flocculation and deflocculation of particles in water is discussed in "Dispersion of Powders in Liquids", second edition 1973, Editor G. D. Parfitt, Applied Science Publishers, London. Parfitt accepts (pages 13 and 23) the general applicability of the DLVO theory. References to work on the flocculation of powders by polymers are given on page 39 of this book. The DLVO theory ("Theory of Stability of Lyophobic Colloids", E. J. W. Verwey and J. Th. G. Overbeck, Elsevier, Amsterdam, 1948 and "Electrophoresis", D. J. Shaw, Academic Press, New York, 1969, chaps. 1–4) provides a model for the dispersion or deflocculation of mineral particles in water on the basis of the repulsion generated on the close approach of particles whose surfaces possess an electrostatic charge, an equivalent charge being present in the form of a diffuse counter-ion layer around the particles. Conveniently, the extent of the charge separation particles is measured by the electrokinetic (Zeta) potential of the particles. To prevent flocculation this potential must be more than 15–20 mV to give sufficient repulsion between the particles.

The model for flocculation of particles suspended in water on the addition of high molecular weight polymers in solution was given by La Mer and his co-workers. This is generally accepted, and is known as the "polymer bridging mechanism". Polymers particularly effective in flocculation are polyacrylamides having a small proportion of carboxy groups produced by hydrolysis. These molecules are highly hydrated and in aqueous solution are stretched out rather than tightly coiled. This enables segments of single molecules to adsorb on to two or more suspended particles, this "bridging" causing the formation of flocs which in general are loose and without great mechanical strength.

Polyacrylamides with carboxy groups are anionic in character, and are particularly useful in flocculation of particles of calcium carbonate; the surface of calcium carbonate particles has a strong tendency to adsorb carboxy groups. The surface active agents useful in the present invention all appear to be effective in adsorbing on to calcium carbonate particles, thus producing electrostatic double layers and Zeta potential values sufficiently high to cause deflocculation. Our understanding of the nature of the present invention is that this electrostatic double layer can be made sufficiently strong (i.e., have a sufficiently high Zeta potential) to interfere with the adsorption of the charged carboxy groups of added polymers which otherwise would cause flocculation.

Thus A. Van Lierde in "Flocculation and Dispersion of Dolomite by Acrylate Polymers", Int. J. Mineral Processing 1974, 1, 81–100, states on page 82:

"It is known, however, that if the electrical charges of the particles and polymer chains is too high, electrostatically repulsed forces oppose adsorption, collision between particles and polymer bridging".

The effect of electrolytes including calcium ions in reducing the Zeta potential of particles deflocculated by anionic deflocculating agents, and so causing partial flocculation, can easily be demonstrated experimentally.

Thus, on the addition of Nopcosant K (a polycarboxylated phosphorylated polymer surfactant) to a suspension of chalk whiting particles in water, some Nopcosant K molecules adsorb (a function of the carboxyl groups). These molecules are negatively charged and impart this charge to the effective surface of the particles. This surface charge is surrounded by an outer diffuse layer of positively charged alkali metal counter ions. It is the inner charged layer (negative) which by repelling the negatively charged carboxy groups on the polyelectrolyte molecules interferes with the adsorption of these latter and thus minimises or entriely prevents the flocculation which occurs in the absence of Nopcosant K.

Calcium ions have a strong tendency to chelate with molecules having several carboxy groups in proximity. This reduces the charge on the molecule, and in consequence reduces the charge on particles having an adsorbed layer of such molecules. Thus on the addition of calcium ions as the multivalent cations to an aqueous suspension of calcium carbonate particles made according to the process of this invention, with both deflocculating surfactant and flocculating polyacrylamide polymer present, chelation occurs, the charge on the particles is reduced, the interference with adsorption of the polyacrylamide is reduced, and flocculation results. A similar effect occurs when a suspension prepared according to this invention is run into water containing dissolved calcium salts which can be hard water from the tap. The invention may thus be said to employ electrostatic interference by an adsorbed surfactant with the adsorption of a polymeric flocculant, and also removal of this inhibition, at least in part, by the action of dissolved calcium or other metal ions, so that flocculation and agglomerate formation occurs.

The reason why calcium ions do not interfere with the adsorption of the anionic (carboxyl) groups of the polyacrylamide or cause precipitation by reaction with it, would appear to reside in the sparse distribution of carboxyl groups along the polymer chain and the unlikelihood, from steric considerations, of the interaction of one calcium ion with two anionic groups.

The following Examples are given for the purpose of illustrating the invention, the amount shown being in grams except where stated otherwise.

EXAMPLE 1: Preparation of Solution of Flocculant

Sample A

A solution of an anionic high molecular weight polyacrylamide filler retention aid, Percol E24 (manufactured by Allied Colloids Ltd., of Bradford, England) as flocculant was prepared by distributing 2.5 g of Percol E24 particles into the vortex of 1,000 grams of rapidly stirred de-ionised water. When the particles had been distributed in the water the stirring rate was reduced so as just to give circulation. When sufficient viscosity had developed to prevent the settlement of remaining undissolved particles, the stirring was stopped and the mixture left in the dark overnight by which time a smooth solution (Sample A) was obtained. This method was employed to minimise decrease of molecular weight of the polymer by mechanical shear.

Demonstration that the flocculant was not precipitated by hard tapwater

This polymer solution, Sample A, gave no cloud or precipitate in tapwater of hardness equivalent to 240 ppm calcium carbonate. Subsequent references in these Examples to the tapwater, are to tapwater of the same hardness. The same tapwater was brought to a pH value of 4.0 by the addition of papermakers' alum and the resulting cloud allowed to settle. The polyacrylamide solution, Sample A, gave no cloud or precipitate when diluted with the clear supernatant liquid.

Demonstration that a chalk whiting suspension was not agglomerated by hard tapwater Sample B Natural chalk whiting (Snowcal 6 ML, sold by Cement Marketing Co. Ltd., London England), 200 g, was mixed into de-ionised water (197 ml) containing 3 ml Normal sodium carbonate solution containing 53 g $Na_2CO_3$/liter. When mixed into tapwater as above a dispersion was formed which settled at a rate indicating the slight flocculation normal for these particles.

Demonstration that a chalk whiting suspension formed flocculated lumps with flocculant polymer solution Whiting dispersion, Sample B, was mixed with polyacrylamide solution, Sample A, in the proportions of 8:1 by weight. By whatever method the mixing was attempted, a thick curdy mixture resulted. When this was mixed into tapwater, a suspension of lumps together with a cloud of fine particles resulted, however the mixing was carried out.

Demonstration that a combination of surface active agent as deflocculant and polymer solution as flocculant gave smooth mixing and a fluid product Suspensions of chalk whiting in water were prepared as follows:

| Sample C | |
|---|---|
| Snowcal 6 ML | 1000 |
| De-ionised water | 250 |
| N/sodium carbonate solution | 12.5 |
| | 1262.5 |
| Sample D | |
| Sample C | 631.25 |
| Dispex W | 10.0 |
| | 641.25 |

Dispex W is a polyacrylate deflocculating agent manufactured by Allied Colloids Ltd., Bradford, England, The following mixes were prepared.

| | Mix | | | | | | |
|---|---|---|---|---|---|---|---|
| | 1. | 2. | 3. | 4. | 5. | 6. | 7 |
| Sample C | 0 | 63 | 94 | 110 | 118 | 122 | 126 |
| Sample D | 126 | 63 | 32 | 16 | 8 | 4 | 0 |
| Sample A | 20 | 20 | 20 | 20 | 20 | 20 | 20 |

Samples C and D were mixed together in each case and this mixture added to Sample A slowly, with stirring. In this series there was a gradation in the properties of the product from Mix 1 (a smooth fluid showing long-flow properties and forming a hard sediment on standing) through Mix 4 (rather thicker, some flow and non-settling) to Mix 7, (a thick, short and curdy mass). Mixes 5 and 6 had some of the characteristics of gels.

The Mixes with a suitable balance of polyacrylamide flocculant and polyacrylate deflocculant formed agglomerates when added with mixing to tapwater of hardness 240 ppm as calcium carbonate. Mix 1 gave short rod-like entities on addition with gentle mixing. Mix 5 needed more vigorous stirring. The agglomerates were formed directly from the whiting mixes without passing through stages of dispersion and reflocculation. The agglomerates settled rapidly, leaving an effectively clear supernatant liquid.

EXAMPLE 2: Use of Dispex N40 polyacrylate surface active agent as deflocculant

A similar series of mixtures to that in Example 1 was prepared using a deflocculant Dispex N40 (Allied Colloids Ltd.) and having the following formulae.

| | Mix: | | | | | |
|---|---|---|---|---|---|---|
| | 1 | 2 | 3 | 4 | 5 | 6 |
| Snowcal 6 ML | 100 | 100 | 100 | 100 | 100 | 100 |
| De-ionised water | 25 | 25 | 25 | 25 | 25 | 25 |
| Normal sodium carbonate solution | 1 | 1 | 1 | 1 | 1 | 1 |
| 1 per cent solution of Dispex N40 | 0 | | | 1.0 | 2.0 | 4.0 |
| 20 per cent Percol E24 solution | 20 | 20 | 20 | 20 | 20 | 20 |
| De-ionised water | 15 | 5 | 0 | 0 | 0 | 0 |

Mix 1 was a lumpy discontinuous mass. Mix 2 was more smooth. Mixes 3 to 6 were continuous gels. Suspensions with long flow were not obtained. Mixes 3 and 4 gave satisfactory agglomerates in hard water. Mix 6, however, gave a cloud, showing that the desired effect could be lost if too much deflocculant surface active agent was present.

EXAMPLE 3: Showing the effect of the proportion of polyacrylamide as flocculant

| Sample E | |
|---|---|
| Snowcal 6 ML | 1000 |
| De-ionised water | 250 |
| Normal sodium carbonate solution | 10 |
| Dispex N40 | 10 |

The following mixes were prepared.

| | Mix: | | | | |
|---|---|---|---|---|---|
| | 1. | 2. | 3. | 4. | 5. |
| Sample E | 126 | 126 | 126 | 126 | 126 |
| Sample A | 5 | 10 | 20 | 40 | 80 |

Mixes 3 to 5 were smooth with a gelatinous character, and gave agglomerates in the tapwater without lump formation.

EXAMPLE 4: Use of a polyphosphate deflocculating agent

A similar exercise was carried out using as deflocculating agent Calgon S, sodium hexametaphosphate manufactured by Albright & Wilson, Ltd., London, England. A proportion of around 0.55 percent of the Calgon S to the whiting appeared to give deflocculation as shown by the flow properties. Mixes with differing proportions of Calgon S and of Percol E24 to the whiting were prepared. Full flow with long-string rheology was not obtained as it had been with Dispex W. However, smooth gelatinous mixes were obtained, for example with 0.10 percent Calgon S and 0.05 percent of Percol E24 to the whiting, and good agglomerate formation was obtained in hard water. As the proportion of Calgon S was increased over 0.3 percent to the whiting, there was an increased tendency to form a cloud on stirring into hard water.

EXAMPLE 5: Alternatives to hard tapwater

All the samples which gave satisfactory agglomerates in the hard tapwater of 240 ppm hardness, exhibited dispersion (perhaps with some re-flocculation) on mixing into de-ionised water. Usually a considerable cloud was formed. The addition of, for example, calcium acetate to the water to give a hardness of about 240 ppm as $CaCO_3$ again gave agglomerate formation. Alternatively a solution of 0.05 percent papermakers' alum in de-ionised water gave good agglomeration results.

EXAMPLE 6: Advantage in papermaking

Handsheets (referred to below as P series) were prepared on a standard sheet-former using Intercontinental Bleached Kraft Pulp, using varying proportions of Snowcal 6 ML chalk whiting to the pulp. Each sheet was prepared from 2000 ml dilute stock containing 1.2 g pulp and to retain the filler and fibre a dilute solution of Percol 140 (cationic polyacrylamide retention aid, Allied Colloids Ltd.) to give 0.001 g of the polymer was added and mixed in gently.

Handsheets (referred to below as Q series) were similarly prepared from the same pulp but without cationic retention aid. The filler was added in the form of agglomerates prepared according to the invention by vigorously mixing into tapwater a suspension of the following composition:

Snowcal 6 ML—1000.0
Dispex W, deflocculant—5.0
Percol E24, anionic flocculant—2.0
De-ionised water—285.0

Strength values (breaking lengths and burst strengths) were determined on the sheets. For a given loading level the strengths were greater for Q series. This enabled more of the cheap filler to be included at a given strength, for example as in the following Table:

| P.series (control) | 7.5 | 13 | 20 | 29 | 40 |
|---|---|---|---|---|---|
| Q.series (invention) | 13.0 | 21 | 30 | 40 | 52.5 |
| Breaking length (Km) | 7 | 6 | 5 | 4 | 3 |

P series gives the filler content (percent w/w) of the oven dry sheets made with Snowcal 6 ML whiting and Percol 140 retention aid. Q series gives the filler content of sheets made according to this invention, employing a slurry of Snowcal 6 ML containing Percol E24 and Dispex W formed into agglomerates in tapwater and then added to the stock.

The economic advantage of the increase in loading level of the filler in the paper is considerable EXAMPLE 7: Use of Nopcosant K This Example shows the use of Nopcosant K (Diamond Shamrock Chemicals (U.K) Ltd., Leeds, England) a polycarboxylated phosphorylated polymer, as deflocculant surface active agent together with as flocculants the anionic high molecular weight polyacrylamide retention aid Percol E24 (Allied Colloids Ltd.), Reten 421 (Hercules Powder Co., Ltd., London, England) or Accurac 200 (BTI Chemicals Ltd., Bradford, England). An aqueous suspension of chalk whiting was made to the following formula:

Snowcal 6 ML—100.0
De-ionised water—25.0
N/sodium carbonate solution—1.24
Nopcosant K—0.5

This was a smooth suspension with long flow properties. It was mixed a little at a time into 20 parts w/w of a 0.25 percent solution of Percol E24 in de-ionised water. Mixing occurred without curdiness to give a smooth product which had long flow properties.

On stirring a sample gently into the tapwater, fine filiform agglomerates were produced. These settled quite rapidly, the supernatant liquid being clear.

Similar results were obtained when Reten 421 or Accurac 200 was used in place of the Percol E24. With the Reten 421, the suspension had a distinctly lower viscosity than with the other polymers and the filiform agglomerates were finer and settled more slowly.

EXAMPLE 8: Showing that hard water may be used in the preparation of the whiting suspension, and that mixed surface active agents can be employed as the deflocculant.

Tapwater pH 7.4, total hardness 240 ppm, 3000 ml, was treated with 25 ml Normal sodium carbonate solution (53 g Na$_2$CO$_3$/liter) to give a pH of 9.5, and 20 ml of 10 percent Calgon S solution was added. With this water, the following mixes were prepared.

Sample F

Treated tapwater—2000
Reten 421—5

Sample G

Snowcal 6 ML—1000
Treated Tapwater—260
Nopcosant K—2.5

Sample H

Sample G was added slowly, with stirring, to 200 g of Sample F. Mixing occurred smoothly, without curdiness, to give a thin suspension with good flow properties and with evidence of stringiness. Addition to Sample G of 0.1 percent to the whiting content of Dispex N40 had a useful thinning effect. This formed good agglomerates in tapwater.

EXAMPLE 9: Showing the use of the process of the invention with china clay

Attempts to carry out the process of the invention using china clay, polyacrylamide polymers and the deflocculating surface active agents, Calgon, Dispex N40 and Dispex W led to failure. Usually the dispersions of the china clay particles with polyacrylamide polymers had poor flow properties, but more importantly, on adding to hard water, dispersion occurred without formation of agglomerates. Success was obtained, however, using Nopcosant K. The following samples were prepared.

| Sample J | China Clay, Grade B (English Clay Sales, St. Austell, England) | 1000 |
|---|---|---|
| | De-ionised water | 575 |
| | | 1575 |
| Sample K | Sample J | 787.5 |
| | Nopcosant K | 10.0 |
| | | 797.5 |

The following mixes were made:

| | Mix: | | |
|---|---|---|---|
| | 1 | 2 | 3 |
| Sample J | 0 | 25 | 50 |
| Sample K | 160 | 135 | 110 |
| Reten 421 solution | | | |
| Sample F | 20 | 20 | 20 |

Mix 1 was a fluid with some tendency to string formation. Mix 2 was notably thicker with some gel structure and Mix 3 was a gel which showed exudation of liquid at the top on standing. All three mixes gave agglomerates on stirring into tapwater, but due to its thickness Mix 3 required the greatest stirring energy, and so had the greatest tendency to form a cloudy supernatant liquid. The agglomerate formation from Mix 1 appeared to be 'less definite' and slower than with a comparable mix based on Snowcal 6 ML, and the agglomerates formed were smaller.

EXAMPLE 10: Showing the process of the invention applied to mixtures of whiting and china clay

| Sample L | Grade B China Clay | 500 |
|---|---|---|

|         |                          |        |
|---------|--------------------------|--------|
|         | De-ionised water         | 288    |
|         | Nopcosant K              | 8.5    |
|         |                          | 796.5  |
| Sample M| Snowcal 6 ML             | 500    |
|         | De-ionised water         | 125    |
|         | N sodium carbonate solution | 6.2 |
|         | Nopcosant K              | 1.25   |
|         |                          | 632.45 |

The following mixes were made.

|                          | Mix: |     |     |
|--------------------------|------|-----|-----|
|                          | 1    | 2   | 3   |
| Sample L                 | 50   | 101 | 151 |
| Sample M                 | 120  | 80  | 40  |
| Reten 421 solution Sample F | 20 | 20  | 20  |

Mix 1 was a fluid, and mixes 2 and 3 were thicker and had a more gelatinous character. On mixing into tapwater all three mixes gave agglomerates, but the agglomerates from Mix 1 were more thread-like in character, and the supernatant liquid from Mix 3 and tapwater had a slight cloud. An addition of 0.25 g Nopcosant K to Mix 3 reduced the viscosity to resemble that of Mix 1, but this did not prevent the formation of a cloud in the supernatant liquid after mixing into the tapwater.

The following samples were prepared, using half each of china clay Grade B and Snowcal 6 ML.

| Sample N | Grade B Clay              | 250   |
|----------|---------------------------|-------|
|          | Snowcal 6 ML              | 250   |
|          | De-ionised water          | 207   |
|          | N sodium carbonate solution | 3.0 |
|          |                           | 710.0 |

The following mixes were prepared.

|                      | Mix: |     |     |     |
|----------------------|------|-----|-----|-----|
|                      | 1    | 2   | 3   | 4   |
| Sample A             | 142  | 142 | 142 | 142 |
| Nopcosant K          | 0.2  | 0.4 | 1.0 | 1.4 |
| De-ionised water     | 12.0 | 12.0| 12.0| 12.0|
| Reten 421 solution Sample F | 20 | 20 | 20 | 20 |

The de-ionized water was added to the filler suspension with surface active agent, and this was then mixed into the 20 g of Sample F.

Mixes 1 and 2 were thick and pasty. Mix 3 was fluid and on mixing into tapwater gave agglomerates with a clear supernatant liquid but of a smaller size than obtained with Snowcal 6 ML along in Example 7, the mixing being carried out similarly. Mix 4 was also fluid and gave agglomerates in the tapwater, but the supernatant liquid after rapid settling was slightly cloudy.

It is thus clear that, while the process of the invention can be carried out with china clay or whiting/china clay mixtures, a larger amount of deflocculating surface active agent is needed than with whiting alone, and it would appear that there is a greater tendency to the formation of a cloudy supernatant liquid after mixing into tapwater to give agglomerates. With china clay the process appears more expensive, and because more critical, less satisfactory than with chalk whiting.

EXAMPLE 11: Showing that sodium silicate may be used as deflocculent in combination with other surface active agents in the process of the invention, even using using tapwater as suspending medium.

The following sample was prepared:

| Sample O | Tapwater | 300 |
|----------|----------|-----|
|          | Snowcal 6 ML | 1000 |
|          | Nopcosant K | 1.0 |
|          | This became fluid after the addition of sodium silicate, Pyramid No. 8 (Joseph Crosfield & Sons Ltd., Warrington) | 4.0 |

To this suspension there was added 100 g 0.25 percent solution of Reten 421 in tapwater.

This gave a smooth fluid suspension that gave agglomerates on stirring into excess tapwater. It was surprising that a fluid suspension of whiting could be made in tapwater which gave agglomerates in the same tapwater.

It was found that the size and strength of the agglomerates was increased by increase in the proportion of the Reten 421. Use of too high a proportion of sodium silicate led to dispersion.

EXAMPLE 12: use of a whiting suspension in tapwater with control of calcium ion content. Use of gypsum water.

The following formulation was found to be particularly useful:

| Sample P | Tapwater (hardness 240 ppm CaCO$_3$) | 340 |
|----------|--------------------------------------|-----|
|          | 2 Normal ammonia solution            | 5   |
|          | 10 percent Ammonium carbonate solution | 1 |
|          | Nopcosant K                          | 1   |
|          | Snowcal 6 ML                         | 1000|
|          | Pyramid No. 8                        | 4   |
|          | 0.4 percent Reten 421/tapwater       | 66  |

This suspension formed good agglomerates when mixed into tapwater.

The ammonia and ammonium carbonate were sufficient in amount to remove most of the calcium ions present in the hard water by precipitation as calcium carbonate.

A solution high in calcium ions was prepared by adding excess natural white gypsum (hydrated calcium sulphate), to the tapwater, stirring, allowing to settle and pouring off the supernatant liquid. This 'gypsum water' was added to portions of sample P in various proportions, slowly, with mechanical stirring. These first thickened and then thinned down. With the proportion of 140 g sample P and 20 ml of gypsum water a nearly smooth mixture was obtained which gave agglomerates of size comparable to softwood paper pulp diameter when stirred into a pulp suspension in hard water. Decrease in gypsum water gave larger agglomerates, and increase in gypsum water gave smaller agglomerates.

Since it was considered that the thickening which occurred on the addition of saturated gypsum water to sample P might not be acceptable in large-scale pratice, the following modifications were made. The solids content was reduced by increasing the water from 340 to 450 ml. The saturated gypsum water was diluted with an equal volume of distilled water and 50 ml of this added to 153 g of sample P. Handsheets were prepared from beaten paper pulp stock with additions of the resulting suspension of agglomerates, and showed the expected increase in strength over sheets formed from unmodified Snowcal 6 ML at the same filler content.

EXAMPLE 13: Further example of use of gypsum water with high proportion of flocculant and addition of filler suspension to gypsum water.

The following sample Q was prepared:

| Sample Q | Tapwater | 340 |
|---|---|---|
| | 2 N ammonia solution | 5 |
| | 10 percent ammonium carbonate | 1 |
| | Nopcosant K | 1 |
| | Snowcal 6 ML | 1000 |
| | Pyramid No. 8 | 4 |
| | 1 percent Reten 421 in tapwater | 105.6 |
| | | 1456.6 |

A volume of tapwater saturated with gypsum (200 ml) was mechanically stirred at high speed in a beaker and 770 g of the above mixing was poured in. A semi-solid mass was formed at first, which suddenly thinned. When mixed into pulp in tapwater and examined under the microscope the agglomerates present were of a suitable size to make smooth and strong paper. There were no oversize lumps or clumps of agglomerates. The agglomerates had superior resistance to disintegration by shear forces (shaking or mechanical mixing).

EXAMPLE 14: Strength advantages of paper containing the agglomerates produced by a continuous mixing process.

Sample R

The following suspension was prepared:
Snowcal 6 ML—500
Distilled water—125
N sodium carbonate solution—6.2
Nopcosant K—2.5

This was added to 100 g of a 0.25 percent solution of Percol E24 in de-ionised water to give a 68 percent solids suspension. This had a gelatinous structure rather than good flow properties.

This suspension was metered into a line carrying hard tapwater by means of a T-piece. The water with added suspension passed through a length of glass tubing so that agglomerates of suitable size were formed by the shear resulting from the flow. The suspension of agglomerates was passed directly into a pulp suspension and stirred in. This avoided the formation of secondary flocs from the primary agglomerates, and thus prevented the production of lumpy paper. Paper formed on a sheet machine from this stock had equal burst strength at 18 percent filler content to a standard with unagglomerated filler of 12 percent filler content.

EXAMPLE 15: Showing that the deflocculants need not be added to the filler before adding the flocculant.

The deflocculants and flocculant may be mixed together and added to the filler suspension in tapwater.

Sample S

The following formulation was made by hand stirring in the order given:

0.4 percent Reten 421 in tapwater—33
2 N ammonia solution—5
10 percent ammonium carbonate solution—1
Nopcosant K—1
Pyramid No. 8—4

Immediately after making, this was added to a slurry as below:
Snowcal 6 ML—1000
Tapwater—340

The mixing occurred smoothly and the whiting/deflocculant/flocculant suspension had as far as could be judged the properties of suspensions according to the invention when added to tapwater. This was found most surprising. It would appear that the action of the deflocculant took priority over that of the flocculant during the mixing process.

When the Reten 421 solution was added to the Snowcal 6 ML suspensions without the deflocculants Nopcosant K and Pyramid 8, flocculation occurred with formation of a thick mass. On addition of these deflocculants with stirring, thinning slowly took place to give a suspension with the property of agglomerate formation in hard water. This method is not favoured for large scale use because of the difficulty of dealing with a bulk of thick gel.

EXAMPLE 16: Showing that the process of Examples 12/13/14 (agglomerate formation by a thickening and thinning process), and Example 15 (addition of deflocculant and flocculant together) can be carried out as one operation.

A slurry of Snowcal 6 ML in tapwater was prepared, having 60 parts by weight of Snowcal and 40 parts by weight of water, and also a mixture of deflocculant and flocculant, namely 67 g of 0.4 percent solution of Reten 421 in de-ionised water with 6 g of Pyramid 8. The Snowcal 6 ML slurry (1670 g) was mixed with an efficient mechanical stirrer and the deflocculant/flocculant mixture added rapidly. There was a rapid thickening, but after 3 minutes mixing a smooth and notably thinner suspension was formed. A portion of this suspension was mixed into a stock of beaten Interchemical Bleached Kraft pulp, to give various filler proportions. Microscopic examination showed that the agglomerates present were similar in appearance to others produced by the invention and were below pulp fibre diameter in size. Oversize agglomerates were absent, and there were few undersize particles.

Without the sodium silicate in the solution of Reten 421, the result was lumpy and discontinuous, presumably due to local filler-flocculant interaction before the flocculant had dispersed throughout the filler suspension. Under the microscope, a mixture of this suspension with pulp could be seen to have many fine particles as well as the evident lumps.

It would appear that the presence of the Pyramid 8, by deflocculating the whiting particles, inhibited the flocculation by the Reten long enough for smooth mixing to occur. The method of this Example appears to utilise the fact that sodium silicate when used alone is a temporary deflocculant for chalk whiting in hard water. It would appear that initial deflocculation is reversed, as insoluble calcium silicate is formed by interaction of the sodium silicate with the calcium ions in the hard water. This in turn allows the Reten to flocculate the whiting particles, causing the thickening. Further stirring caused the flocculated mass to break up into agglomerates of desirable size.

The process was found not to operate to give agglomerates when the Snowcal 6 ML suspension was made in de-ionised water. Nor did it operate successfully with a large proportion of Pyramid 8. Presumably this interacted with all the available calcium ions, leaving some sodium silicate to deflocculate the whiting. Success was not obtained with more permanent deflocculants such as Dispex N40. In this case no thickening occurred.

No other method was found of obtaining the useful results of the method of this Example when flocculant alone was added to a filler slurry. A sufficient decrease of the concentration of the whiting suspension before addition of the flocculant solution, together with good stirring, avoided local lump formation, but the flocs formed were weak, and were not strong agglomerates as measured by resistance to break-up under a standard mixing procedure. Similarly, decrease in the proportion of flocculant tended to reduce lump formation, but gave weak flocs.

Paper handsheets were prepared from agglomerates produced by various of the above methods. Only when the pulp/filler suspension had an appearance similar to that obtained with products of other Examples of the invention was the desired improvement in the strength of the resulting paper sheets obtained. Smooth paper was obtained by the process using a flocculant/deflocculant mixture, but where flocculant alone was used, roughness due to lumps was evident.

EXAMPLE 17: Acid resistance of agglomerates

Acid resistance assessment was carried out as follows. A glass breaker with magnetic stirrer contained 500 ml of tapwater. Using a pH meter, the pH value was adjusted to 5.0 using dilute sulphuric acid. A whiting suspension in an amount containing 2.0 g of chalk whiting was prepared and treated in various ways and then added to the acidified water stirred in a standard manner. The pH fell with time at different rates, according to the formulation and manner of operation. The pH at 3 minutes after the addition was taken as a measure of the acid resistance, -the lower the value, the better the resistance.

The following experiments were carried out:

A. Whiting/deflocculant/flocculant suspension Sample P was added while the magnetic stirrer was operating.

B. A portion of Sample P was shaken with a small amount of tapwater, the agglomerates allowed to settle and the clear top liquid poured off. The sediment was then washed into the water at pH 5 by dunking.

C. As B, but omitting the Reten 421 from the formulation.

D. Sample P pre-treated with gypsum water as in the first part of Example 12.

E. One stage agglomeration carried out as in Example 16.

F. As E, but Pyramid 8 omitted.

G. As E, but Reten omitted.

H. With Snowcal 6 ML added as a 50 percent dispersion in distilled water.

|  | pH after 3 minutes |
| --- | --- |
| Experiments C, G and H, control experiments: | 6.7 to 6.8 |
| Experiment A, direct addition of suspension: | 5.6 |
| Experiment B, pre-formation of agglomerates: | 5.8 |
| Experiment D, using gypsum saturated water: | 6.2 |
| Experiment E, using one stage agglomeration with Pyramid 8: | 6.0 |
| Experiment F, as E but omitting Pyramid 8: | 6.4 |

The resistance to acid attack increased with agglomerate size, strength and uniformity. Where direct addition of Reten 421 to a slurry of Snowcal 6 ML gave a wide size distribution of agglomerates, acid resistance was not good, presumably because of the high rate of attack on the fine particles. Because of the good uniformity of agglomerate size in Experiment E, using Pyramid 8 with the Reten 421, acid resistance was good in spite of the general smallness of the agglomerates and the absence of lumps.

EXAMPLE 18: Using china clay and sodium silicate

Sample T

Grade B china clay—200
De-ionised water—126
10 percent Pyramid 8 solution in de-ionised water—8

This gave a deflocculated dispersion. On adding a solution of 10 g of 0.4 percent Reten 421 in de-ionised water a thick but flowing mix was obtained. The addition of 1.7 g of Nopcosant K was required before the suspension became thin. This mix thickened up on standing overnight, but thinned again on stirring. It gave reasonable agglomerates in hard water but the supernatant liquid was slightly cloudy.

EXAMPLE 19: Showing that the presence of gelatinised starch does not prevent agglomerate formation In papermaking machine water gelatinised starch is frequently present, either as 'beater starch' or from coating broke. Such process water could be used to make up the filler suspension. It was desired to determine whether the presence of starch was likely to interfere with the agglomeration process. The following mixes were prepared.

| Raw farina | 15 |
| --- | --- |
| Tapwater | 285 |
|  | 300 |

The farina was solubilised by raising the temperature to 90° C. with mechanical stirring.

To 148 g of whiting/deflocculant/flocculant suspension Sample P (containing 100 g Snowcal 6 ML) was added 100 g of the above starch solution, giving 5 percent starch to the filler. On stirring into tapwater, agglomerates were still formed.

Starch can become associated with mineral filler particles by precipitation as described in British Pat. No. 1,353,015. The actual presence of starch has not been found to increase the tensile or burst strength of the paper to any great extent, presumably partly because this strength depends on fibre-fibre bonding and not on bonding of the filler particles, but also because the precipitation process impairs the bonding properties of the starch. The presence of chemically insolubilised starch alone or with other polymers does, however, reduce dusting of filler particles from the paper surface and improves resistance to filler pick.

The demonstration in the present example of the possibility of including non-insolubilised starch (retaining its full bonding capacity) in the filler agglomerates is important as indicating a method of bonding the filler particles together and so reducing dusting of the resulting paper. In certain cases where it is desirable to increase the bonding of the filler particles together in the agglomerates in the final dried paper it may be advantageous to add a proportion of latex or polymer emulsion to the filler/deflocculant/flocculant suspension before forming agglomerates by addition to hard water.

EXAMPLE 20: Agglomerates from a mixture of chalk whiting and titanium dioxide pigment

| Sample U | Titanium dioxide pigment | |
|---|---|---|
| | Anatase A-HR (Tioxide International) | 50 |
| | Snowcal 6 ML | 450 |
| | Tapwater | 170 |
| | | 670 |

This mix was stiffer at this stage than when using Snowcal 6 ML alone. The following were added in order with mixing.
2 N ammonia solution—2.5
10 percent Ammonium carbonate solution—0.5
Nopcosant K—0.5
Pyramid 8—2.0
0.4 percent Reten 421 in tapwater—33.0

At this stage the mix was thinner than with Snowcal 6 ML.

It was surmised that this was due to interpacking of the fine titanium dioxide particles between the larger whiting particles.

Agglomerates were formed when this mixing and a similar one but using Rutile pigment Tioxide R-HD2 were mixed into tapwater.

It is observed when titanium dioxide is used in paper as an opacifying pigment, that the opacity is less than might be expected. This can be due to enclosure of the particles within a cellulose matrix or to formation of flocs composed solely of titanium dioxide with reduction of light scattering. The process of the present invention forms agglomerates from a dispersion of randomly interpacked whiting and titanium dioxide particles. The likelihood of formation of flocs wholly composed of titanium dioxide particles is small. With suitably sized agglomerates and a suitable whiting-titanium dioxide ratio, the light scattering power of the latter should be well utilised.

EXAMPLE 21: Use of Pyramid 9 alone as deflocculant

Sample V

The following were mixed together:
Distilled water—340
2 N Ammonia solution—5
10 percent Ammonium carbonate solution—1
Snowcal 6 ML—1000

Sample W

The following were mixed together:
Pyramid 8—12
0.4 percent Reten/distilled water—66

Sample W was added to Sample V. This thickened up considerably, and thinned down after 4 minutes hand stirring. Agglomerate formation in tapwater was good.

EXAMPLE 22: Showing agglomerate formation with content of starch-borax complex

Sample X

Solution of starch-borax compound
Distilled water at about 35° C.—380
Stadex 613 (Starch Products, Ltd., Slough)—20
Mechanically stirred for 15 minutes to give solution Sample Y Whiting suspension
Tapwater—340
2 N Ammonia solution—5
10 percent Ammonium carbonate solution—1
Snowcal 6 ML—1000
0.4 percent Reten 421 in tapwater—66

This had a very thick consistency, but thinned down on the addition of
Nopcosant K—1
Pyramid 8—4
to give Sample Z.

Varying proportions of Stadex 613 solution were added to aliquots of this suspension. Too much Stadex 613 impaired agglomerate formation but the following proportions were satisfactory:

| Sample Z, thin suspension | 142 |
|---|---|
| Sample X, Stadex 613 solution | 30 |

This gave films when dried on glass which did not dust on rubbing by a finger. Without the Stadex 613, dusting on the finger was severe.

EXAMPLE 23: Showing the use of Pyramid 8 with other surface active agents

Pyramid 8 being an economical deflocculant to use, the following mix was prepared:

| Sample AA | Tapwater | 340 |
|---|---|---|
| | Snowcal 6 ML | 1000 |
| | 2 N Ammonia solution | 5 |
| | 10 percent Ammonium Carbonate solution | 1 |
| | Pyramid 8 | 4 |
| | 0.4 percent Reten 421 in tapwater | 66 |
| | | 1416 |

This mix was thick and formed rather large agglomerates in tapwater.

To aliquots of 142 g of this Sample AA were added the following:
(a) 0.8 ml 10 percent Chemviron T (Ellis Jones, Stockport), a zinc-modified polyphosphate in distilled water;
(b) 0.4 ml 10 percent Calgon S (Albright & Wilson Ltd.);
(c) 0.8 ml 10 percent Dispersol T (I.C.I. Ltd.) - a commercial anionic flocculant;
(d) 0.8 ml 1 percent Dispex N 40 (Allied Colloids Ltd.);
(e) 1.0 ml 1 percent Dispex W (Allied Colloids Ltd.).

All the above were thinner than the base mix without addition. All gave satisfactory agglomerates when stirred into tapwater. The thinnest mixes, (a) and (e) gave agglomerates of a smaller size however.

EXAMPLE 24: Use of an organic quaternary ammonium silicate

| Tapwater | 340 |
|---|---|
| Snowcal 6 ML | 1000 |
| 2 N Ammonia solution | 5 |
| 10 percent Ammonium carbonate solution | 1 |
| Quram 220, quaternary ammonium silicate (Croxton & Garry, Ltd., Esher, Surrey) | 34 |

This was a thin deflocculated suspension. To it was added 0.4% Reten 421 in tapwater 66.

There was little thickening and a thin suspension resulted. Agglomerates formed in tapwater were small.

EXAMPLE 25: Failure to make agglomerates satisfactorily using tapwater and a precipitatable polymer Sample BB The following mixing was prepared:
Primal ASE 95 (Rohm & Haas Ltd.)—50
Distilled water 450

The Primal is an alkali soluble polyacrylic type emulsion and this mixture was a limpid white emulsion. To this was added 1 percent sodium hydroxide solution until the pH was 10.0. The emulsion clarified, and a viscous solution resulted.

| Sample CC | Tapwater | 340 |
|---|---|---|
| | 2 N Ammonia solution | 5 |
| | 10 percent Ammonium carbonate solution | 1 |
| | Nopcosant K | 1 |
| | Snowcal 6 ML | 1000 |
| | Pyramid 8 | 4 |
| | | 1351 |

To 135 g of Sample CC was added varying amounts of the solubilised Primal ASE 95, Sample BB, from 1.65 to 13.2 parts. When added to tapwater all gave a cloudy supernatant liquid. To obtain clear agglomeration it was necessary to add 0.5 percent papermakers' alum to the tapwater. Addition of further polymer solution impaired the result. This example thus clearly distinguishes the process of the invention from a process depending on polymer precipitation; the former has clear advantages over a process such as the latter.

We now describe the nature of the agglomerates formed by the process of the invention, and some practical methods and apparatus for forming the agglomerates.

It is of the essence of the invention as applied to paper-making that agglomerates of filler particles are formed which are separate from the fibres of the papermaking furnish. It is important that these agglomerates should have good strength and not be subject to disintegration by the shear forces operative in the papermaking system, for example in the cleaners and the fan pump, due to the drawings and shake of the paper machine wire and due to the suction of the suction boxes. In the normal papermaking process the filler particles are dispersed in a dilute state throughout the whole stock, and just before the stock is discharged on to the wire of the papermaking machine a continuous addition is made of a retention aid, which may be polyacrylamide or cationic starch in solution. It is well-known in the papermaking art that the flocs which are formed under these conditions are mixed flocs of fibre and filler, and are very weak. It is for this reason that retention aids are added to the papermaking system as late as possible, so that the flocs formed are not subjected to heavy shear.

Agglomerates made according to the process of the invention are, however, much stronger. They are also composed of filler particles, and are not co-flocs of filler and fibre. They are formed from suspensions of filler which can have a solids content of 70 percent. This contrasts with the concentration of filler particles in a normal papermaking stock, which could be of the order of 0.5 percent. This means that agglomerates according to the invention are much more concentrated and 'tighter', in contrast to present papermaking practice where the flocs are loose. It is this difference which largely gives the extra strength to the agglomerates of the invention.

The nature of the agglomerates produced according to the invention may be clarified by means of photomicrographs. When a photomicrograph (A) of long-fibred paper making pulp with deflocculated particles of natural chalk whiting is compared with another (B) of the same material to which very dilute cationic polyacrylamide (Percol 140 from Allied Colloids, Ltd) has been added, agglomerates are seen in the case (B) of filler particles around the fibres, the losseness of the agglomerates being apparent. It is clear how these filler particles obstruct the process of interfibre bonding when the paper is formed, leading to lowered strength properties.

Photomicrographs (C) of the same pulp but with agglomerates formed according to the invention reveal the following features of interest. The agglomerates move separately from the fibres upon disturbance and will clearly obstruct the bonding of the paper fibres less than in the foregoing case. When rubbed between sliding plates the agglomerates did not readily disintegrate but rather rolled up into sausage-shaped structures, indicating gelatinous and flexible character. By contrast agglomerates formed as in (B) by flocculating a suspension of chalk whiting by an addition of cationic polyacrylamide disintegrated when similarly rubbed.

It has been found consistently in experimental work that when a papermaking pulp as (C) having the appearance characteristic of the invention has been prepared, and experimental paper sheets have been formed from it, they have been stronger than sheets formed from stock having the appearance and properties of the abovementioned pulp (A) or (B). The difference is such that when paper was made from stocks as (A) or (B) with 20 percent whiting content, and from stock as (C) with 27 to 30 percent whiting content, the burst and tensile stengths were similar.

It is further consistently found that agglomerates having the appearance under the microscope of (C) have a decreased rate of reaction with acid. Indeed, there has been a consistent correlation between strength of paper and resistance to attack by acid. On consideration of the fact that it is the effective surface area of the particles or agglomerates which (i) interfere with fibre bonding and (ii) is subject to attack by acidic water, this correlation is to be expected.

The resistance to attack by acid is valuable in that it enables sizing of the paper sheet by the normal acidic rosin/alum sizing process to be carried out. This is a distinct and notable advantage of the process of the invention.

The importance of making strong agglomerates by the process of the invention is shown by the experimental fact that a stock having the appearance of (C) and giving paper in the higher strength range, gave paper in the lower strength range after the agglomerates had been broken down (as shown by microscopic examination) by violent mechanical mixing in a high-speed disintegrator. This indicates that in a paper machine system the suspension of agglomerates should be added continuously to the stock after the refiners or any other strong disintegration process.

The method chosen for the preparation of the agglomerates will in practice depend greatly upon the kind of plant which is available in the individual paper mill. Various alternative processes are indicated below.

BATCH-WISE DIRECT ADDITION

The agglomerates may be prepared by direct addition of a filler/deflocculant/flocculant suspension to a hard water. It is preferred that the water is mechanically stirred with an off-center propeller blade so that a 'downstream vortex' is formed. The filler suspension is poured into this vortex, when agglomerates are produced, most of which are of a suitable size. On continuing stirring the small proportion of lumps or over-size agglomerates which are formed may be broken down without any major change in the finer agglomerates present.

Continuous manufacture of agglomerates suspension by in-line mixing.

A number of in-line mixers are available; some of these bring two streams of liquid together into a space in which a propeller or similar mixer is operating. Others employ pressure of the liquid forced through jets to provide the mixing energy. Still others, under the general term of 'static mixers', employ a sub-division of the mixed streams. A well-known example of this latter is the Kenics Mixer (Kenics—Europe, Chequers House, The Green, Flore, Northants, MN7 4LG). These various methods have been tested out on the laboratory or pilot scale and shown to be worthy of consideration in particular papermill situations. For example a glass laboratory filter pump was connected to a tap supplying water at a hardness of 240 ppm at full mains pressure. The normal suction inlet of the filter pump was connected to the tap, and a rubber tube was connected to the normal (jet) tap connection. The mains tap was opened, but not fully, and the rubber tubing filled with treated tapwater by sucking it up out of a beaker. This rubber tubing was then closed, and the end dipped into a beaker containing Sample H, described in the foregoing Examples. On opening the rubber tube this mix was sucked up and discharged by the jet into the flow of tapwater. The resultant suspension of whiting agglomerates was collected in a bucket.

The individual agglomerates were comparable in size to papermaking fibres, and were mostly rod-like in shape. It was found that the size and shape of the agglomerates could be controlled by the tap pressure, and the degree of dilution and the polymer content of the whiting suspension and the hardness of the water. It was necessary to use treated tapwater for dilution.

There would be little difficulty in scaling up this method to full papermill operation.

Other methods of preparing agglomerates have been found useful, for example using a spinning disc. In this method a container was provided with a bottom outlet and supported within the container was an opentopped funnel-shaped vessel connected at its bottom by a pipe to a source of hard water. Within and slightly below the top edge of the vessel was a horizontal disc rotatable at a high velocity on a central shaft. A pipe which discharged onto the top surface of the disc was connected to a source of the filler suspension to be converted into agglomerates. Connected to the shaft beneath the disc was a paddle. In use the shaft was rotated at high speed and the hard water was fed to the funnel-shaped vessel. The level of liquid in the vessel rose until it was engaged by the paddle, causing the body of liquid in the vessel to rotate and form a vortex, surplus liquid overflowing the top edges of the funnel into the container and discharging through the outlet. The suspension fed to the upper surface of the disc passed thence under the influence of centrifugal force to the outer edge of the disc, from where minute droplets were thrown outwards and captured by the surrounding vortex of hard water in which they formed agglomerates. The water thus laden with agglomerated filler overflowed into the container. Depending upon the flow properties, i.e., the spinnable nature, rheological dilatancy and viscoelasticity of the suspension and the rate of supply, the agglomerates produced in this way may be filiform in character.

A further method employed simple mechanical mixing using a propellor type stirrer. Flows of tapwater and of suspension as Sample P of the foregoing Examples were led into the turbulence produced by the stirrer. A mixture of small agglomerates with lumps was formed. The suspension of these was led up inside an inverted pyramidal vessel through a hole at the apex. The turbulence produced by the stirrer caused little motion in the suspension in the inverted pyramidal vessel, so that a process of classification occurred. Any lumps formed settled down the sloping sides of the pyramid and into the turbulence produced by the stirrer, where they were subjected to disintegration. Fibre-sized agglomerates passed upwards and were continuously removed from the top as a lump-free suspension of a desirable size and freedom from fine particles.

An attempt to use a 100-mesh B.S. sieve, to separate agglomerates of the wanted size from lumps, these latter being returned for further disintegration, was less successful owing to sieve blinding.

There are other possibilities, increasing in complexity. One is to inject the filler/flocculant/deflocculant suspension into water at the jet of a hydrocyclone. The overflow of fine particles would be utilised while the underflow would be re-passed through the jet until disintegrated.

These methods have the advantage that agglomerates of desirable size are removed from the zone of disintegration. Suspensions with a minimum proportion of unnecessarily fine particles are produced.

The preparation of aerosols of liquid particles of fine and controlled particle size is a well-advanced technology. There is an advantage in making an air dispersion of the filler/deflocculant/flocculant suspension, because this can be done without the risk of breaking up the particles by liquid shear to form fines. The particles of the aerosol can be captured by hard water, whereupon a dispersion of agglomerates may be formed without any fine particles present. There is a further advantage in this process that under suitable conditions the apparatus making the aerosols can be 'over-loaded' so that liquid with threads or fibres rather than round aerosol particles are produced. Such fibres can be captured in hard water. Suspensions of such fibres could be especially useful as paper fillers because of improved retention and improved distribution throughout the paper sheet.

As an example of atomisation in air and capture in hard water, a Micron Ulva atomiser head was obtained from Micron Sprayers Ltd., Bromyard, Herefordshire, England. This consisted of a plastics bowl with a fine serrated edge, which could be rotated at high speed by a twelve-volt DC battery-fed motor. When water was supplied to the inlet to the apparatus a very fine mist of droplets was formed. A filler suspension, Sample P of the foregoing Examples, was diluted with de-ionised water and supplied to the rotating head. A spray of droplets was formed. These were caught in a vortex of hard water formed by rotating a large bucket of this water on a turntable. The droplets formed were uniform in particle size and slightly larger than softwood fibre diameter when viewed under the microscope.

An alternative device for catching the droplets consisted of a metal funnel inserted in a container of hard water so that the water flowed inwards over the lip of the funnel in a uniform stream. The rotating disc was inserted inside the funnel, the droplets formed being caught in this down-flowing film of hard water.

Other devices for atomisation use an air blast. As examples, the Lec ULV fog generator HD from the Lowndes Engineering Company, Inc., Valdosta, Georgia, U.S.A, employs a split air stream, one stream of which passes through a jet and encounters the other stream, which has been forced into a rotating motion by a vane device; Lurmark Ltd., of Longstanton, Cambridge, also supply a compressed air jet atomiser. A spinning basket device for making aerosols is supplied by Micronair (Aerial) Ltd., of Bembridge Fort, Isle of Wight.

To supply the volumes of agglomerate suspension which would be required for a full scale operation in a paper mill, multiple devices of the foregoing types might be required as direct sealing up tends to give larger droplets than when made by a small scale appliance.

A device found effective at high throughput is a Wagner electric airless high-pressure spray unit 2600H. This formed aerosol droplets rather larger than desirable for the smoothest papers but adequate for example for newsprint.

What is claimed is:

1. A method of manufacturing paper having increased dry strength and increased wet strength to give improved machine runnability at a given content of mineral filler, which method comprises the steps of:
    (a) preparing a concentrated but pourable aqueous suspension of mineral particles which contains, in solution, (i) an anionic polymeric material which normally acts as an anionic flocculating agent for said mineral particles in aqueous suspension in an amount sufficient to flocculate said mineral particles and (ii) an anionic deflocculant in an amount just sufficient to inhibit the flocculating action of said polymeric material, said anionic polymeric material does not thicken said suspension and said suspension being prepared in the substantial absence of papermaking fibres;
    (b) contacting the suspension of step (a) with an aqueous solution containing a sufficient amount of metallic cations of a valency greater than 1 as to counteract the operation of said anionic deflocculant and thereby permit flocculation of said mineral particles by said polymeric material to form agglomerates,
    the polymeric material being such that it is not of itself insolubilized or precipitated from an aqueous dispersion thereof by the addition of the aqueous solution of step (b);
    (c) forming a papermaking stock containing said agglomerated mineral particles and papermaking fibres in the substantial absence of co-flocs of mineral particles and papermaking fibres; and
    (d) forming a paper web from the papermaking stock of step (c).

2. The method as defined in claim 1, wherein step (c) is continuous, the agglomerated particles being added continuously to a continuous flow of cellulosic fibre suspension.

3. The method as defined in claim 1, wherein step (b) is effected in a manner such as to produce filiform agglomerates.

4. The method as defined in claim 1, wherein the suspension of step (a) is spun in air and at least part thereof is captured in said aqueous solution containing metallic cations of a valency greater than 1.

5. The method as defined in claim 1, wherein the mineral particles are formed of a material selected from calcium carbonate, clay, titanium dioxide and mixtures thereof; the flocculant is a polyacrylamide and is present in an amount of from $4 \times 10^{-5}$ to 0.1% based upon the weight of the filler; the deflocculant is selected from polyacrylates, polyphosphates, carboxylated polyphosphates, silicates and alkali solubilized lactic casein, the amount of said deflocculant being from 0.01 to 0.5% based upon the weight of filler, and the suspension of step (a) has a solids content of from 20 to 70% by weight.

* * * * *